Aug. 11, 1931.  H. GRÜSS  1,818,847
APPARATUS FOR MEASURING A PLURALITY OF VALUES
Filed March 5, 1929
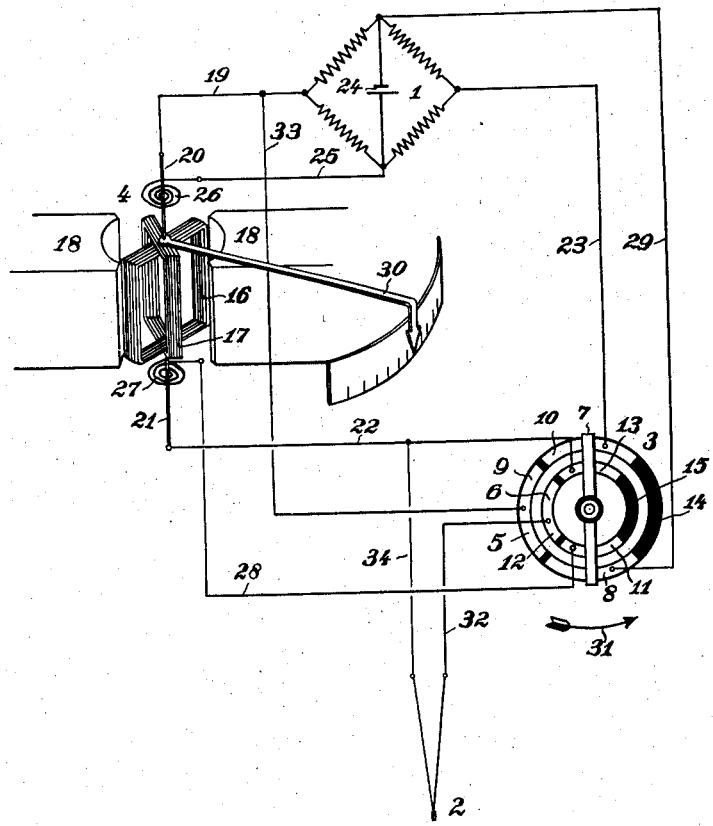
INVENTOR
HEINZ GRÜSS
BY
*Fika, Kehlenbeck & Tatley*
ATTORNEYS.

Patented Aug. 11, 1931

1,818,847

UNITED STATES PATENT OFFICE

HEINZ GRÜSS, OF BERLIN-STAAKEN, GERMANY, ASSIGNOR TO SIEMENS & HALSKE AKTIENGESELLSCHAFT, OF SIEMENSSTADT, NEAR BERLIN, GERMANY, A CORPORATION OF GERMANY

APPARATUS FOR MEASURING A PLURALITY OF VALUES

Application filed March 5, 1929, Serial No. 344,548, and in Germany March 29, 1928.

The present invention relates to measuring and recording instruments, and particularly to instruments of the type which is based on the thermal-conductivity method for gas analysis wherein the quantity of a gas in a mixture of gases is determined by the measurement of the resistance of a wire surrounded by such gas mixture in comparison with the resistance of a similar wire surrounded by a reference gas of known composition.

The indication or registration of a plurality of any desired measuring values, in particular of such values as are produced by resistance variations simultaneously with those produced by electromotive forces, by means of a common movable system and with the aid of recording devices employing differently colored inks for recording the different kinds of measurements, is known. In general the movable system used in such measuring devices is a rotating coil, the adjustment of which is necessarily dependent on the variations of the working potential necessary for the measurement of the resistance variations.

Efforts have been made to overcome this defect by the use of cross coil moving systems, which of course can only be used for the measurement of resistances. In such arrangements it has hitherto been necessary to use two movable systems, of which one was constructed as a cross coil system for the measurement or registration of the quantities indicated by the resistance variation, and the other, a rotating coil system influenced by means of the electromotive forces produced for the measurement of the other quantities. Such an arrangement is very cumbersome in the construction of the two systems and is objectionable also because it necessitates, when being read off, the observation of two different indicators.

Devices of the known type indicated above are described in a paper entitled "Thermal-conductivity method for the analysis of gases" by P. E. Palmer and E. R. Weaver, (Technologic Papers of the Bureau of Standards, No. 249—part of vol. 18, pages 35 to 100, January 7, 1924—see in particular Fig. 4 on page 43).

According to the invention the disadvantages of the known arrangements are overcome by the use of a single cross coil rotating system which is employed to measure different values or quantities in alternation, and on which a purely mechanical directing force acts during the measurement of quantities produced by electromotive forces, while it is influenced simultaneously by a mechanical and an electromagnetic directing force during the subsequent measurement of a second group of measuring values, produced by resistance variations. It is preferable so to select the physical constants of the system that the electromagnetic directing force is much larger, for example five or ten times larger than the mechanical directing force. In such an arrangement, for example, on the measurement of the first group of measuring values, the directive moment coil of the cross coil instrument may be switched out, while during the measurement of a second group of measuring values the directive moment coil is influenced by the working potential.

An example of a construction in accordance with the invention is shown on the drawing, and illustrates the simplest case where only two different values are to be determined, of which one is influenced by an alteration in resistance, as of the first wire mentioned above, and the other by an electromotive force. A bridge connection 1 serves for example to obtain the carbonic acid, or carbon monoxide contents of furnace gases, as described in detail in the paper cited above while a thermo element 2 serves for the measurement of the temperature of the gases. The two measuring apparatuses 1 and 2 are connected by means of a reversing switch 3 to a common rotating system 4 made up of cross coils, serving for registering or indicating the different values. The reversing switch 3 contains two rings 5 and 6 arranged to be bridged by a rotating switch 7 consisting of two opposite insulated metal parts and actuated by clockworked or similar mechanism. Each of the two rings contains three opposite insulated metal pieces 8, 9, 10 and 11, 12, 13, and also a segment of insulating material 14 and 15. The cross coil system 4 contains a galvanometer coil 16 and a shortened directive moment coil 17, which is rotatably arranged at a cross angle of about 50° in the field of a permanent magnet 18.

In the position of the switch 7 shown in the drawing, the measuring apparatus 1 is connected to the cross coil system 4. The current circuit for the galvanometer coil 16 runs from the bridge-connection 1 through a conductor 19 over a torsion ribbon 20, through the coil 16, the torsion ribbon 21, over a conductor 22 to the contact segment 13, over the upper part of the switch 7 to the contact segment 10, and through the conductor 23 back to the bridge conductor 1. The potential of the battery 24 supplying the bridge is connected to the directive moment coil 17 through the conductor 25, the current conducting spring 26, coil 17, current conducting spring 27, (which, like spring 26, is arranged to exert a mechanical directing force on the coil system), conductor 28, contact segment 11, lower part of the switch 7, contact segment 8, and conductor 29, the springs 26 and 27 being fixed at their outer ends, as to the housing of the instrument and being attached at their inner ends to, but electrically insulated from, the torsion ribbons 20, 21, such inner ends being electrically connected with the coil 17 by wires insulated from the torsion ribbons. The indicator 30 of the cross coil system 4 in this case therefore measures, for example, the carbon monoxide or the carbonic acid content of the furnace gases as will be clear from a study of the paper referred to hereinabove (see also United States Patent #1,562,243). On the further movement of switch 7 in the direction of the arrow 31, the upper part thereof moves from the contact segment 10 to the contact segment 9, and at the same time its lower part moves to the segments 14 and 15 consisting of insulating material. The measuring part 1 is thus switched off from the system 4, and the thermo element 2 is connected therewith. In this position of the switch the galvanometer coil 16 is switched into the current circuit of the thermo element 2, while the directive moment coil 17 is switched off. The current circuit for the galvanometer coil 16 runs from the thermo element 2 through the conductor 32, contact segment 12, through the parts 7, 9, 33, 19, 20, 16, 21, 34 and back to the thermo element; in the further course of the movement of the switch 7 this alternating action is repeated.

I have found that by appropriately dimensioning the small torsion ribbons 20 and 21 and the coils 16, 17, and suitably arranging the field magnet 18, the electromotive directing moment may be made many times greater than the mechanical directing moment exerted by the small torsion ribbons 20, 21, and the two current conducting springs 26 and 27. The form of construction shown in the drawing of a cross current instrument with shortened directive moment coil and with a crossing angle of about 50°, described in my co-pending application Serial No. 265,908, is of particular advantage, as such an instrument has a comparatively large maximum throw without prejudice to the accuracy of measurement, and the zero position of the system is not altered by switching out the directive coil 17.

I have further found that the directive forces of the current conducting ribbons 20, 21, 26 and 27 necessary except for the cross coil connection, are sufficiently large to permit an adjustment of the system without electrical directive force of the coil 17. On the other hand the conducting ribbons also influence the adjustment of the system in cross coil connection, but the slight dependence of the cross coil measurement on the auxiliary potential 24 necessary thereto, may be kept very low as is in general the case with cross coil instruments.

I claim:—

1. Apparatus for the indication or registration of two groups of measuring values, the first group being produced by variations of electric resistances and the second group being produced by electromotive forces, comprising, in combination, a movable coil system, means for causing a mechanical directional force to operate upon said coil system, means for causing an electromagnetic directional force to operate upon said coil system, a switch for connecting the electric resistances of the first group and the electromotive forces of the second group one after the other to said coil system, and mechanism for rendering said second mentioned means inoperative when an electromotive force of said second group is impressed on said coil system.

2. Apparatus for the indication or registration of two groups of measuring values, the first group being produced by variations of electric resistances and the second group being produced by electromotive forces, comprising, in combination, a movable coil system, including two crossed coils, at least one spring arranged to act as a mechanical directional force of said coil system, a first switch for connecting the electric resistances of the first group and the electromotive forces of the second group one after the other to one of the coils of said coil system, a source of current, and a second switch arranged to connect said source of current to the other coil of said coil system only when said first switch connects one of the electric resistances of the first group to the first-named coil of said coil system.

3. Apparatus for the indication or registration of two groups of measuring values, the first group being produced by variations of electric resistances and the second group being produced by electromotive forces, comprising, in combination, a movable coil system, including two crossed coils, at least one spring arranged to act as a mechanical directional force of said coil system, a first switch for connecting the electric resistances of the first group and the electromotive forces of the second group one after the other to one of said coils of said coil system, a source of current, and a second switch arranged to connect said source of current to the other coil of said coil system, and means for coupling said first switch and said second switch in such a manner that the second switch is closed only when the first switch connects one of the resistances of the first group to the coordinated coil of said coil system.

4. Apparatus for the indication or registration of two groups of measuring values, the first group being produced by variations of electric resistances and the second group being produced by electromotive forces, comprising, in combination, a movable coil system, including two crossed coils one of which is many times smaller than the other, at least one spring arranged to act as a mechanical directional force of said coil system, a first switch for connecting the electric resistances of the first group and the electromotive forces of the second group one after the other to the larger coil of said coil system, a source of current, a second switch arranged to connect said source of current to the smaller coil of said coil system only when said first switch connects one of the electric resistances of the first group to the first-named coil of said coil system.

In testimony whereof I affix my signature.

HEINZ GRÜSS.